(12) United States Patent
Saiko et al.

(10) Patent No.: US 9,457,796 B2
(45) Date of Patent: Oct. 4, 2016

(54) VEHICLE AND CONTROL METHOD FOR VEHICLE

(71) Applicants: Masaaki Saiko, Nagoya (JP); Isao Sato, Nagoya (JP); Ryo Watanabe, Toyota (JP)

(72) Inventors: Masaaki Saiko, Nagoya (JP); Isao Sato, Nagoya (JP); Ryo Watanabe, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/424,654

(22) PCT Filed: Nov. 14, 2013

(86) PCT No.: PCT/IB2013/002766
§ 371 (c)(1),
(2) Date: Feb. 27, 2015

(87) PCT Pub. No.: WO2014/083420
PCT Pub. Date: Jun. 5, 2014

(65) Prior Publication Data
US 2015/0217758 A1    Aug. 6, 2015

(30) Foreign Application Priority Data

Nov. 28, 2012   (JP) ................................ 2012-259932

(51) Int. Cl.
*B60W 20/15*    (2016.01)
*B60W 20/00*    (2016.01)
(Continued)

(52) U.S. Cl.
CPC ............ *B60W 20/108* (2013.01); *B60K 6/365* (2013.01); *B60K 6/445* (2013.01); *B60W 10/06* (2013.01); *B60W 10/12* (2013.01); *B60W 20/00* (2013.01); *B60W 20/15* (2016.01); *B60W 30/1846* (2013.01); *B60W 2520/10* (2013.01); *B60W 2710/0644* (2013.01); *Y02T 10/6239* (2013.01); *Y10S 903/93* (2013.01); *Y10T 477/606* (2015.01)

(58) Field of Classification Search
None
See application file for complete search history.

(56) References Cited

U.S. PATENT DOCUMENTS

| 2008/0153651 A1* | 6/2008 | Matsubara | ............... B60K 6/40 |
| | | | 475/151 |
| 2009/0227409 A1* | 9/2009 | Ito | .......................... B60K 6/445 |
| | | | 475/5 |
| 2010/0069196 A1* | 3/2010 | Shibata | .................... B60K 6/40 |
| | | | 477/3 |
| 2010/0121512 A1 | 5/2010 | Takahashi et al. | |

(Continued)

FOREIGN PATENT DOCUMENTS

| JP | 2010-111321 A | 5/2010 |
| JP | 2010-264852 A | 11/2010 |
| JP | 2012-046053 A | 3/2012 |

*Primary Examiner* — Justin Holmes
(74) *Attorney, Agent, or Firm* — Kenyon & Kenyon LLP (57) ABSTRACT

A vehicle includes: an engine; a first electric motor capable of inputting or outputting power; a power split mechanism including a sun gear, a ring gear and a planetary carrier rotatably revolvably supporting pinion gears meshing with the sun and ring gears. The planetary carrier, the sun gear and the ring gear are respectively coupled to an engine output shaft, a first electric motor rotary shaft and a drive wheel. The vehicle further includes a second electric motor capable of inputting or outputting power to or from the drive wheel; and a control device setting an engine operation range determined by a limit value of a rotation speed of the pinion gears. To increase durability of the pinion gears, the limit value is higher at a high engine rotation and low vehicle speed side than at a low engine rotation and high vehicle speed side. Engine operation is controlled on the basis of the set engine operation range.

2 Claims, 5 Drawing Sheets

(51) Int. Cl.
*B60K 6/365* (2007.10)
*B60K 6/445* (2007.10)
*B60W 10/06* (2006.01)
*B60W 30/184* (2012.01)
*B60W 10/12* (2012.01)

(56) References Cited

U.S. PATENT DOCUMENTS

2010/0292881 A1 11/2010 Takahashi
2011/0111919 A1* 5/2011 Wenthen ................ F16H 3/724
477/2

* cited by examiner

VEHICLE AND CONTROL METHOD FOR VEHICLE

CROSS-REFERENCE TO RELATED APPLICATIONS

This is a national phase application based on the PCT International Patent Application No. PCT/IB2013/002766 filed Nov. 14, 2013, claiming priority to Japanese Patent Application No. 2012-259932 filed Nov. 28, 2012, the entire contents of both of which are incorporated herein by reference.

BACKGROUND OF THE INVENTION

1. Field of the Invention

The invention relates to a vehicle on which an engine (internal combustion engine) and an electric motor are mounted as driving power sources and which includes a power split mechanism in a powertrain, and a control method for the vehicle.

2. Description of Related Art

There is a hybrid vehicle, as an example of a vehicle, that includes an engine, a first electric motor (first motor generator MG1), a power split mechanism (planetary gear mechanism) and a second electric motor (second motor generator). The first electric motor is able to input or output power. The power split mechanism includes three rotating elements, that is, a sun gear, a ring gear arranged concentrically with the sun gear and a planetary carrier that supports pinion gears meshed with those sun gear and ring gear such that the pinion gears are rotatable and revolvable. The second electric motor is able to input or output power to drive wheels. An output shaft (crankshaft) of the engine is coupled to the planetary carrier among the three rotating elements of the power split mechanism. A rotary shaft of the first electric motor is coupled to the sun gear. The drive wheels are coupled to the ring gear.

In the thus configured hybrid vehicle, an engine operation range is set in consideration of the durability of the engine and gears, and the like, of the powertrain (for example, see Japanese Patent Application Publication No. 2010-264852 (JP 2010-264852 A) and Japanese Patent Application Publication No. 2012-046053 (JP 2012-046053 A)). With the technique described in the above publications, the engine operation range is set to a range in which the rotation speed (number of revolutions) of the pinion gears that rotate due to a difference in rotation between the sun gear and the ring gear does not exceed an allowable rotation speed (limit value) in a high engine rotation and low vehicle speed range, and the engine operation range is similarly limited in a low engine rotation and high vehicle speed range.

SUMMARY OF THE INVENTION

Incidentally, for the engine operation range, if the way of setting the limit value of the rotation speed of the pinion gears is the same between in the high engine rotation and low vehicle speed range and in the low engine rotation and high vehicle speed range, there is an inconvenience in the following points.

Firstly, a torque request for the vehicle differs between in the high engine rotation and low vehicle speed range and in the low engine rotation and high vehicle speed range, so a transitional variation in the rotation speed of the pinion gears differs therebetween.

More specifically, as an example of the transitional variation in the low engine rotation and high vehicle speed range, it may be, for example, assumed that the engine rotation speed is decreased by releasing an accelerator pedal while the vehicle is traveling at a high vehicle speed. In such a case, the engine rotation speed is decreased by the torque of the first motor generator MG1.

On the other hand, as an example of a transitional variation in the high engine rotation and low vehicle speed range, it may be assumed that the engine rotation speed is increased at a low vehicle speed by depressing an accelerator pedal while the vehicle is going up a hill. In such a case, engine torque increases in order to increase the engine rotation speed. Furthermore, torque output from the second motor generator MG2 also increases in order to gain the output torque of the vehicle. Here, in order to increase the amount of current supplied to the second motor generator MG2, the first motor generator MG1 carries out regenerative operation. Therefore, the first motor generator MG1 works as a load on the engine, so the engine rotation speed is hard to vary as compared to that in the low engine rotation and high vehicle speed range. That is, the engine rotation speed more easily varies in the low engine rotation and high vehicle speed range, so the rate of transitional variation in the rotation speed of the pinion gears increases (an overspeed of the pinion gears more easily occurs).

Although there is such a difference in transitional variation in the rotation speed of the pinion gears between in the high engine rotation and low vehicle speed range and in the low engine rotation and high vehicle speed range, if the way of setting the limit value of the rotation speed of the pinion gears is the same between in the high engine rotation and low vehicle speed range and in the low engine rotation and high vehicle speed range as in the above-described control, an overspeed easily occurs in one of the ranges when the limit value is set so as to be suitable for the other one of the ranges. Thus, the durability of the pinion gears may be adversely influenced or a decrease in vehicle performance may occur due to unnecessary limitations on the engine operation range.

The invention provides a technique for, in a vehicle that includes a power split mechanism in a powertrain, being able to both ensure vehicle performance and ensure the durability of pinion gears of the power split mechanism.

A first aspect of the invention provides a vehicle. The vehicle includes: an engine; a first electric motor configured to be able to input or output power; a power split mechanism including a sun gear, a ring gear and a planetary carrier that supports pinion gears, meshing with both the sun gear and the ring gear, such that the pinion gears are rotatable and revolvable, the planetary carrier being coupled to an output shaft of the engine, the sun gear being coupled to a rotary shaft of the first electric motor, the ring gear being coupled to a drive wheel; a second electric motor configured to be able to input or output power to or from the drive wheel; and a control device for the vehicle. The control device is configured to set an engine operation range that is determined by a limit value of a rotation speed of the pinion gears of the power split mechanism such that the limit value of the rotation speed of the pinion gears is higher at a high engine rotation and low vehicle speed side than at a low engine rotation and high vehicle speed side, and control operation of the engine on the basis of the set engine operation range.

According to the above aspect, the rate of transitional variation in the rotation speed of the pinion gears increases (an overspeed of the pinion gears more easily occurs) at the low engine rotation and high vehicle speed side than at the high engine rotation and low vehicle speed side. In consideration of the above point, for the engine operation range that is determined by the limit value of the rotation speed of the pinion gear, the limit value (absolute value) of the rotation speed of the pinion gears at the high engine rotation and low vehicle speed side is set so as to be higher than the limit value (absolute value) of the rotation speed of the pinion gears at the low engine rotation and high vehicle speed side. With the above configuration, while unnecessary limitations on the engine operation range at the high engine rotation and low vehicle speed side are avoided, it is possible to avoid an overspeed (overshoot) of the pinion gears at the low engine rotation and high vehicle speed side.

A second aspect of the invention provides a control method for a vehicle including an engine; a first electric motor configured to be able to input or output power; a power split mechanism including a sun gear, a ring gear and a planetary carrier that supports pinion gears, meshing with both the sun gear and the ring gear, such that the pinion gears are rotatable and revolvable, the planetary carrier being coupled to an output shaft of the engine, the sun gear being coupled to a rotary shaft of the first electric motor, the ring gear being coupled to a drive wheel; and a second electric motor configured to be able to input or output power to or from the drive wheel. The control method includes: setting an engine operation range that is determined by a limit value of a rotation speed of the pinion gears of the power split mechanism such that the limit value of the rotation speed of the pinion gears is higher at a high engine rotation and low vehicle speed side than at a low engine rotation and high vehicle speed side; and controlling operation of the engine on the basis of the set engine operation range.

According to the above second aspect, similar advantageous effects to those of the first aspect are obtained.

In this way, according to the above-described aspects, it is possible to appropriately set the engine operation range, so it is possible to both ensure vehicle performance and ensure the durability of the pinion gears.

According to the above-described aspects, in the vehicle that includes the power split mechanism in the powertrain, it is possible to both ensure vehicle performance and ensure the durability of the pinion gears of the power split mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In the present embodiment, description will be made on the case where the invention is applied to a front-engine front-drive (FF) hybrid vehicle.

Figure 1:
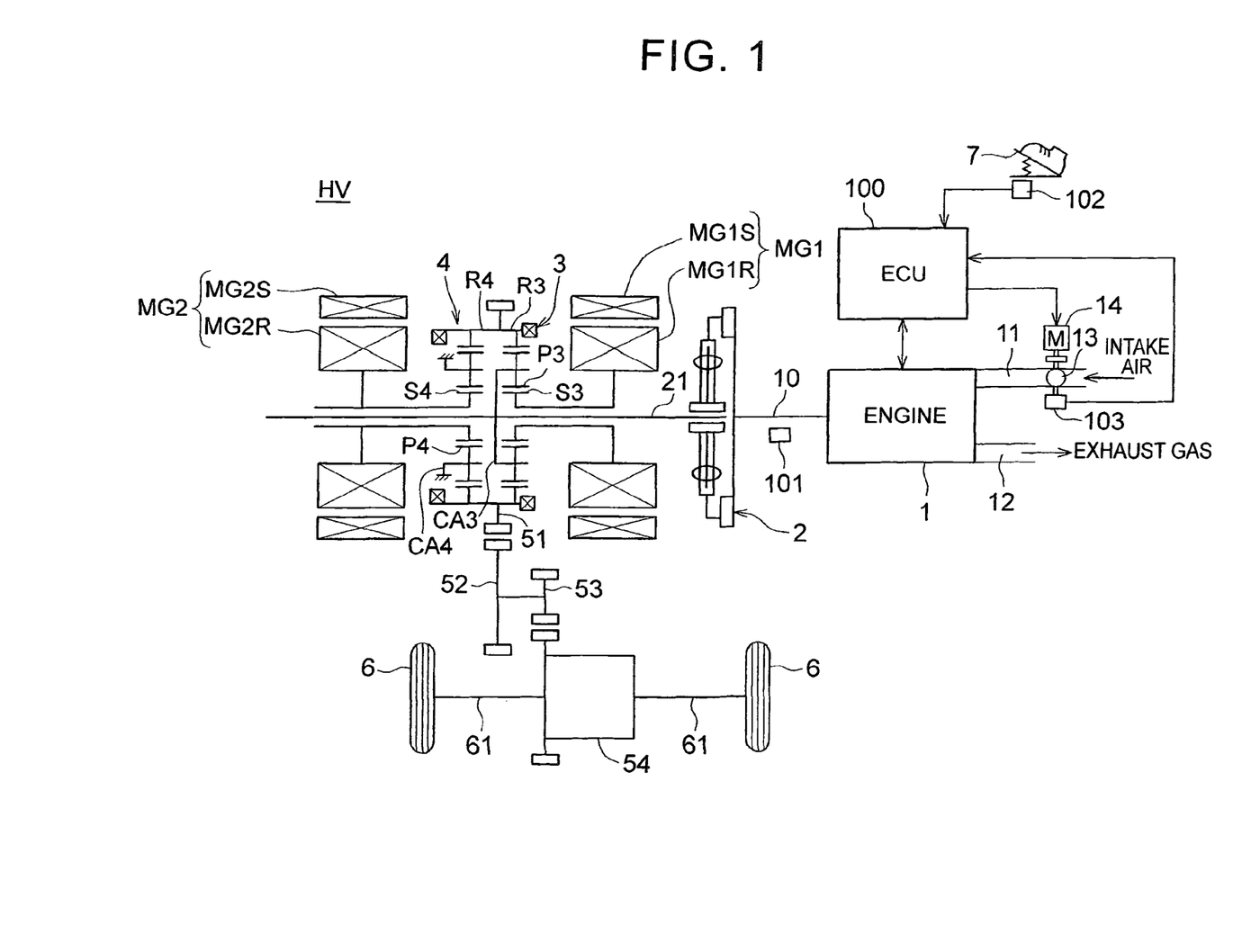
FIG. 1 is a schematic configuration view that shows an example of a hybrid vehicle to which the invention is applied.

FIG. 1 is a view that shows the schematic configuration of a hybrid vehicle to which the invention is applied. As shown in FIG. 1, the hybrid vehicle HV includes an engine (internal combustion engine) 1, a first motor generator MG1 (first electric motor), a second motor generator MG2 (second electric motor), a power split mechanism 3, a reduction mechanism 4, a counter drive gear 51, a counter driven gear 52, a final gear 53, a differential unit 54, right and left drive shafts 61, right and left drive wheels (front wheels) 6, right and left driven wheels (rear wheels, not shown), an electronic control unit (ECU) 100, and the like. The engine 1 generates driving force for propelling the vehicle. The first motor generator MG1 mainly functions as a generator. The second motor generator MG2 mainly functions as an electric motor. A vehicle and a control method for a vehicle according to the invention are implemented by programs executed by the ECU 100.

The ECU 100 is, for example, formed of a hybrid (HV) ECU, an engine ECU, a battery ECU, and the like. These ECUs are communicably connected to one another.

Next, portions of the engine 1, the motor generators MG1, MG2, the power split mechanism 3, the reduction mechanism 4, the ECU 100, and the like, will be described.

Figure 2:
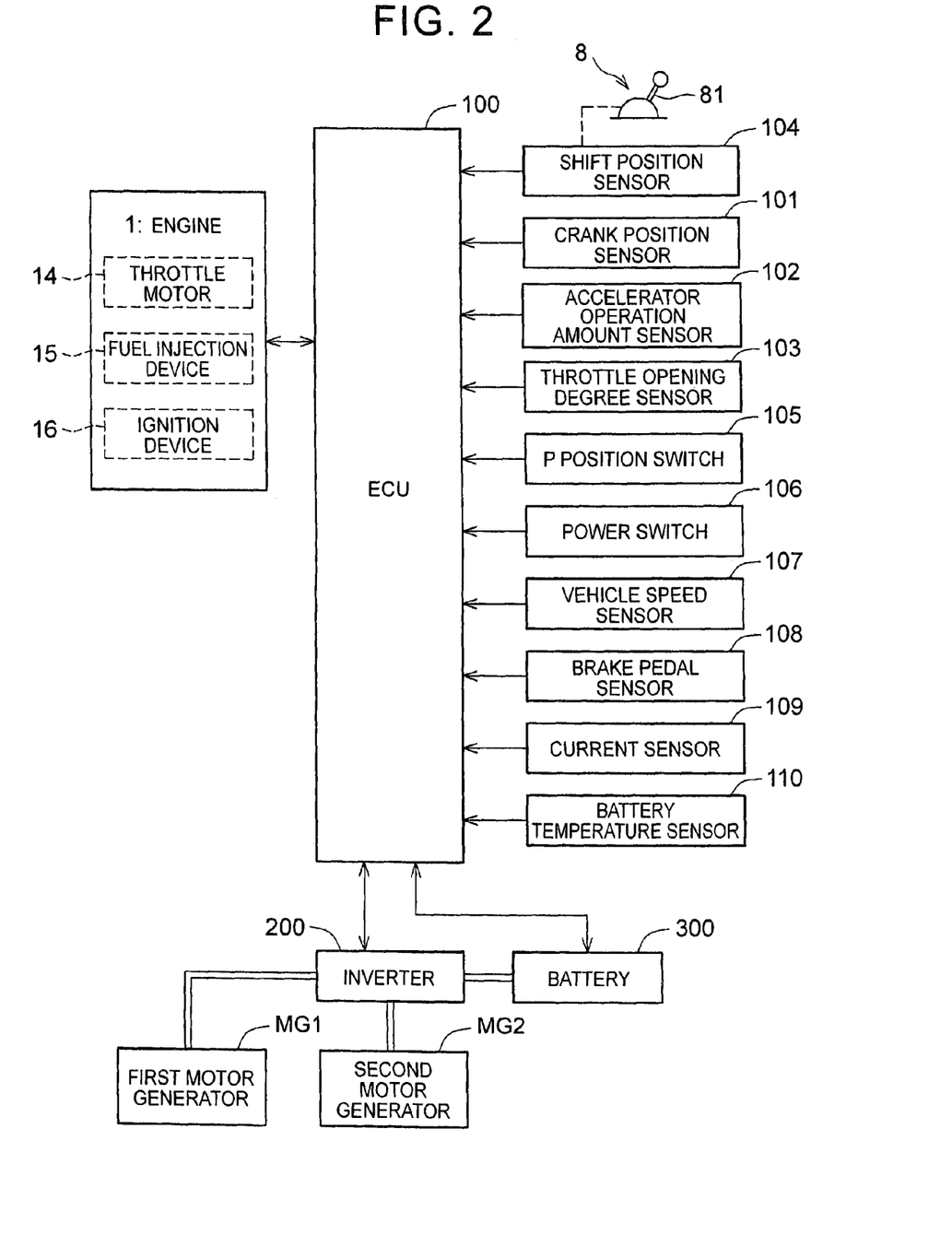
FIG. 2 is a block diagram that shows the configuration of a control system, such as an ECU.

The engine 1 is a known power device, such as a gasoline engine and a diesel engine, that burns fuel to output power, and is configured to be able to control an operation state, such as a throttle opening degree of a throttle valve 13 provided in an intake passage 11, a fuel injection amount injected by a fuel injection device 15 (see FIG. 2) and an ignition timing of an ignition device 16 (see FIG. 2). A crank position sensor 101 is arranged in the engine 1. The crank position sensor 101 detects the rotation angle (crank angle) of a crankshaft 10 that is an output shaft. It is possible to calculate an engine rotation speed Ne on the basis of an output signal of the crank position sensor 101. An exhaust passage 12 is connected to the engine 1, and burned exhaust gas is released to the atmosphere via an exhaust passage 12 after being purified by an exhaust gas control device, such as an oxygen catalyst (not shown).

Known electronic throttle control is employed as control over the throttle valve 13 of the engine 1. In the known electronic throttle control, for example, the throttle opening degree is controlled such that an optimal intake air amount (target intake air amount) based on the state of the engine 1, such as the engine rotation speed Ne and a driver's accelerator pedal depression amount (accelerator operation amount), is obtained. The opening degree of the throttle valve 13 is detected by a throttle opening degree sensor 103.

The power of the engine 1 is transmitted to an input shaft 21 via the crankshaft 10 and a damper 2. The damper 2 is, for example, a coil spring-type transaxle damper, and absorbs torque fluctuations of the engine 1.

As shown in FIG. 1, the first motor generator MG1 is an alternating-current synchronous generator including a rotor MG formed of a permanent magnet relatively rotatably supported with respect to the input shaft 21 and a stator MG1S on which three-phase coils are wound, and functions as a generator and also functions as an electric motor. Similarly, the second motor generator MG2 is an alternating-current synchronous generator including a rotor MG2R formed of a permanent magnet relatively rotatably supported with respect to the input shaft 21 and a stator MG2S on which three-phase coils are wound, and functions as an electric motor and also functions as a generator.

As shown in FIG. 2, the first motor generator MG1 and the second motor generator MG2 each are connected to a battery (electrical storage device) 300 via an inverter 200. The inverter 200 is controlled by the ECU 100, and regeneration or power running (assisting) of each of the motor generators MG1, MG2 is set through control over the inverter 200. The battery 300 is charged with regenerated electric power at that time via the inverter 200. Electric power for driving each of the motor generators MG1, MG2 is supplied from the battery 300 via the inverter 200.

As shown in FIG. 1, the power split mechanism 3 is formed of a planetary gear mechanism that includes a sun gear S3, pinion gears P3, a ring gear R3 and a planetary carrier CA3. The sun gear S3 is an external gear that rotates at the center of a plurality of gear elements. The pinion gears P3 are external gears that revolve and rotate around the sun gear S3 while circumscribing the sun gear S3. The ring gear R3 is an internal gear formed in a hollow annular shape so as to be in mesh with the pinion gears P3. The planetary carrier CA3 supports the pinion gears P3, and rotates through revolution of the pinion gears P3.

The planetary carrier CA3 is integrally rotatably coupled to the engine 1-side input shaft 21. The sun gear S3 is integrally rotatably coupled to the rotor MG1R of the first motor generator MG1. The ring gear R3 is coupled to the drive shafts 61 (drive wheels 6) via the counter drive gear 51, the counter driven gear 52, the final gear 53 and the differential unit 54. Thus, the sun gear S3, the ring gear R3 and the planetary carrier CA3 constitute three rotating elements of the power split mechanism (planetary gear mechanism) 3.

In the thus configured power split mechanism 3, when reaction torque generated by the first motor generator MG1 is input to the sun gear S3 against the output torque of the engine 1, input to the planetary carrier CA3, a torque larger than the torque input from the engine 1 appears at the ring gear R3 that is an output element. In this case, the first motor generator MG1 functions as a generator. When the first motor generator MG1 functions as a generator, the driving force of the engine 1, input via the planetary carrier CA3, is distributed to the sun gear S3 side and the ring gear R3 side on the basis of its gear ratio.

On the other hand, at the time of issuance of a request to start the engine 1, the first motor generator MG1 functions as an electric motor (starter motor), and the driving force of the first motor generator MG1 is applied to the crankshaft 10 via the sun gear S3 and the planetary carrier CA3, and the engine 1 is cranked.

While the vehicle is traveling, it is possible to continuously (steplessly) vary the rotation speed (number of revolutions) of the engine 1 by increasing or decreasing the rotation speed of the first motor generator MG1 when the rotation speed (output shaft rotation speed) of the ring gear R3 is constant in the power split mechanism 3. That is, the power split mechanism 3 functions as a shifting unit.

The reduction mechanism 4 is formed of a planetary gear mechanism that includes a sun gear S4, pinion gears P4 and a ring gear R4. The sun gear S4 is an external gear that rotates at the center of a plurality of gear elements. The pinion gears P4 are external gears that are rotatably supported by a carrier (transaxle case) CA4 and that rotate while circumscribing the sun gear S4. The ring gear R4 is an internal gear formed in a hollow annular shape so as to be in mesh with the pinion gears P4. The ring gear R4 of the reduction mechanism 4, the ring gear R3 of the power split mechanism 3 and the counter drive gear 51 are integrated with one another. The sun gear S4 is integrally rotatably coupled to the rotor MG2R of the second motor generator MG2.

The reduction mechanism 4 reduces the speed of the driving force of the second motor generator MG2 at an appropriate speed reduction ratio. The driving force reduced in speed is transmitted to the right and left drive wheels 6 via the counter drive gear 51, the counter driven gear 52, the final gear 53, the differential unit 54 and the drive shafts 61.

A shift operation device 8 (see FIG. 2) is provided in the hybrid vehicle HV according to this embodiment. A shift lever 81 is displaceably provided in the shift operation device 8. The shift operation device 8 according to this embodiment has set a forward traveling drive range (D range), a forward traveling brake range (B range), a reverse traveling reverse range (R range) and a neutral-state neutral range (N range), and allows a driver to displace the shift lever 81 to a desired range. In the forward traveling brake range (B range), braking force (engine braking) at the time when the accelerator pedal is released is large. Positions of these D range, B range, R range and N range are detected by a shift position sensor 104. An output signal of the shift position sensor 104 is input to the ECU 100.

A P position switch 105 (see FIG. 2) for setting into a parking position (P position) for parking the vehicle is provided near the shift lever 81. The P position switch 105 is a switch for switching the shift position between the parking position (P position) and a position (non-P position) other than the parking position, and outputs an operation signal to the ECU 100 when the P position switch 105 is operated by the driver.

A power switch 106 (see FIG. 2) for switching between a start-up and stop of a hybrid system (vehicle system) is provided in the hybrid vehicle HV. The power switch 106 is, for example, an alternate action push button switch, and is configured to alternately switch between a switch on state and a switch off state each time the switch is pressed. Here, the hybrid system is a system that executes travel control over the hybrid vehicle HV by executing various controls including operation control over the engine 1, drive control over the motor generators MG1, MG2, cooperative control over the engine 1 and the motor generators MG1, MG2, and the like.

When the power switch 106 is operated by a user including the driver, the power switch 106 outputs a signal corresponding to the operation (IG-on command signal or IG-off command signal) to the ECU 100. The ECU 100 starts up or stops the hybrid system on the basis of, for example, the signal output from the power switch 106.

Specifically, when the ECU 100 receives the IG-on command signal as a result of operation of the power switch 106 (IG-on operation), the ECU 100 starts up the hybrid system. Thus, the vehicle enters a state where the vehicle is travelable. The state where the vehicle is travelable is a state where it is possible to execute travel control over the vehicle in response to a command signal of the ECU 100, and is a state (ready-on state) where the hybrid vehicle HV is able to start and travel when the driver depresses the accelerator pedal. The ready-on state also includes a state where the hybrid vehicle HV is able to start and travel with the use of the second motor generator MG2 in a state where the engine 1 is stopped.

The ECU 100 stops the hybrid system if the power switch 106 is, for example, operated (for example, short-pressed) at the P position during a stop of the vehicle while the hybrid vehicle is in operation.

The ECU 100 is an electronic control unit that controls the above-described hybrid system, and includes a central processing unit (CPU), a read only memory (ROM), a random access memory (RAM), a backup RAM, and the like.

Various control programs, maps that are consulted at the time of executing those various control programs, and the like, are stored in the ROM. The CPU executes arithmetic processing on the basis of the various control programs and maps stored in the ROM. The RAM is a memory that temporarily stores computed results in the CPU, data input from sensors, and the like. The backup RAM is a nonvolatile memory that stores data, and the like, to be saved, for example, while the ignition is off.

As shown in FIG. 2, the crank position sensor 101, an accelerator operation amount sensor 102, the throttle opening degree sensor 103, the shift position sensor 104, the P position switch 105, the power switch 106, a vehicle speed sensor 107, a brake pedal sensor 108, a current sensor 109, a battery temperature sensor 110, and the like, are connected to the ECU 100. The accelerator operation amount sensor 102 detects the operation amount of an accelerator pedal 7 (see FIG. 1). The throttle opening degree sensor 103 detects the opening degree of the throttle valve 13 of the engine 1. The vehicle speed sensor 107 outputs a signal corresponding to the speed of the vehicle. The brake pedal sensor 108 detects a depression force on a brake pedal (brake depression force). The current sensor 109 detects a charge/discharge current of the battery 300. Furthermore, sensors that indicate operating states of the engine 1, such as a coolant temperature sensor that detects an engine coolant temperature and an air flow meter that detects an intake air amount, are connected to the ECU 100. Signals from these sensors are input to the ECU 100.

A throttle motor 14, a fuel injection device (injector, and the like) 15, an ignition device (an ignition plug, an igniter, and the like) are connected to the ECU 100. The throttle motor 14 opens or closes the throttle valve 13 of the engine 1.

The ECU 100 executes various controls over the engine 1 on the basis of output signals of the above-described various sensors. The various controls over the engine 1 include opening degree control over the throttle valve 13 of the engine 1, fuel injection amount control (open/close control over the injector), ignition timing control (drive control over the ignition plug), and the like. The ECU 100 controls the operation of the engine 1 on the basis of an engine operation range (map) (described later).

Furthermore, in order to manage the battery 300, the ECU 100 computes a state of charge (SOC) of the battery 300, an input limit Win and output limit Wout of the battery 300, and the like, on the basis of an accumulated value of the charge/discharge current detected by the current sensor 109, the battery temperature detected by the battery temperature sensor 110, and the like.

The inverter 200 is connected to the ECU 100. The inverter 200, for example, converts direct current from the battery 300 to current for driving the motor generators MG1, MG2 on the basis of command signals (for example, a torque command value of the first motor generator MG1 and a torque command value of the second motor generator MG2) from the ECU 100, and converts alternating current generated by the first motor generator MG1 using the power of the engine 1 and alternating current generated by the second motor generator MG2 through regenerative braking to direct current for charging the battery 300. The inverter 200 supplies alternating current generated by the first motor generator MG1 as electric power for driving the second motor generator MG2 on the basis of a travel state.

In the thus configured hybrid vehicle HV, a torque (required torque) to be output to the drive wheels 6 is calculated on the basis of an accelerator operation amount Acc, corresponding to a driver's depression amount of the accelerator pedal, and a vehicle speed V, and the engine 1 and the motor generators MG1, MG2 undergo operation control such that the hybrid vehicle HV travels at a required driving force corresponding to the required torque.

In the operation control over the engine 1 and the motor generators MG1, MG2, specifically, in order to reduce a fuel consumption, the second motor generator MG2 is utilized such that a required torque is obtained in an operation range in which the required torque is relatively low. On the other hand, in an operation range in which the required torque is relatively high, the second motor generator MG2 is utilized and the engine 1 is driven such that the required torque is obtained using driving force from these drive sources.

More specifically, when the operation efficiency of the engine 1 is low at the time when the vehicle, for example, starts or travels at a low speed, the vehicle is caused to travel (carry out EV traveling) with the use of only the second motor generator MG2. When the driver selects an EV drive mode with the use of a drive mode selection switch arranged in a vehicle cabin as well, the vehicle is caused to carry out EV traveling.

On the other hand, during normal traveling (HV traveling or engine traveling), for example, the driving force of the engine 1 is distributed by the power split mechanism 3 to two routes, directly drives the drive wheels 6 using one of the driving forces (drives the drive wheels 6 using directly transmitted torque), and electric power is generated by driving the first motor generator MG1 using the other one of the driving forces. At this time, the drive wheels 6 are supplementarily driven by driving the second motor generator MG2 using electric power generated by driving the first motor generator MG1 (the drive wheels 6 are driven through an electrical path).

In this way, the power split mechanism 3 functions as a differential mechanism, mechanically transmits a major part of power from the engine 1 to the drive wheels 6 due to the differential action, and electrically transmits the remaining part of power from the engine 1 from the first motor generator MG1 to the second motor generator MG2 using the electrical path. Thus, the power split mechanism 3 functions as an electrical continuously variable transmission of which a speed ratio is electrically changed. Thus, it is possible to freely control the engine rotation speed and the engine torque without depending on the rotation speed (number of revolutions) and torque of the drive wheels 6, and it is possible to obtain the operating state of the engine 1 of which the fuel consumption is optimized while obtaining driving force required for the drive wheels 6.

When the vehicle travels at a high speed, electric power from the battery 300 is further supplied to the second motor generator MG2, and driving force is added to the drive wheels 6 (driving force is assisted, power running is carried out) by increasing the power of the second motor generator MG2.

When the vehicle decelerates, the second motor generator MG2 functions as a generator to carry out regenerative power generation, and recovered electric power is stored in the battery 300. If the state of charge (remaining level, SOC) of the battery 300 decreases and the battery 300 particularly needs to be charged, the amount of electric power generated by the first motor generator MG1 is increased by increasing the power of the engine 1. Thus, the amount of electric power at which the battery 300 is charged increases. When the vehicle travels at a low speed as well, control for increasing the power of the engine 1 may be executed as needed. This is, for example, the case where the battery 300 needs to be charged as described above, the case where an auxiliary, such as an air conditioner, is driven, the case where the temperature of coolant of the engine 1 is increased to a predetermined temperature, or the like.

In the hybrid vehicle HV according to the present embodiment, the engine 1 is stopped in order to improve fuel economy depending on the operating state of the vehicle and the state of the battery 300. After that as well, the operating state of the hybrid vehicle HV and the state of the battery 300 are detected, and the engine 1 is restarted. In this way, in the hybrid vehicle HV, the engine 1 undergoes intermittent operation (repeated operation to stop and restart the engine).

In the present embodiment, in consideration of the durability of the engine and the durability of the gears of the powertrain, the engine operation range in which the operation of the engine 1 is permitted is preset. An example of the engine operation range is shown in FIG. 3.

Figure 3:
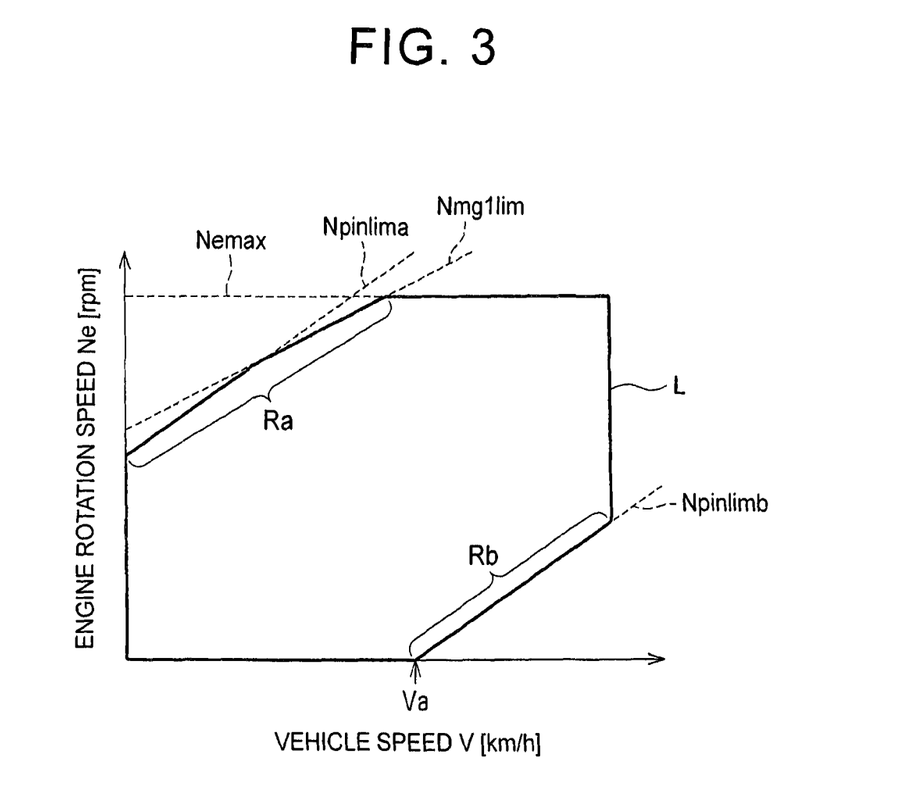
FIG. 3 is a graph that shows an example of an engine operation range.

The engine operation range shown in FIG. 3 defines the operation range of the engine 1 (engine rotation speed limit range) using the vehicle speed V and the engine rotation speed (number of revolutions) Ne as parameters, and the engine operation range shown in FIG. 3 is stored in the ROM of the ECU 100 as a map.

In the engine operation range shown in FIG. 3, in a range indicated by Ra in FIG. 3, that is, a high engine rotation and low vehicle speed range, an upper limit value of the engine rotation speed Ne is limited to a rotation speed lower than a maximum engine rotation speed (permissible rotation speed of the engine 1 itself) Nemax. Specifically, for the range indicated by Ra in the graph, the engine operation range (the upper limit value of the engine rotation speed Ne) is limited by a limit value (MG1 positive rotation-side limit value) Nmg1lim that is determined on the basis of the maximum rotation speed (permissible rotation speed) of the first motor generator MG1 and a limit value Npinlima (pinion gear negative rotation-side limit value) of the rotation speed of the pinion gears P3 that rotate due to a difference in speed (rotation speed difference) between the sun gear S3 (first motor generator MG1) and ring gear R3 of the power split mechanism 3. The limit value Npinlima of the rotation speed of the pinion gears P3 at the high engine rotation and low vehicle speed side (pinion gear negative rotation side) will be described later.

In the engine operation range shown in FIG. 3, in a range indicated by Rb in the graph, that is, a low engine rotation and high vehicle speed range (range higher than or equal to a vehicle speed Va (for example, Va=90 to 100 km/h)), the engine operation range (lower limit value of the engine rotation speed Ne) is limited by a limit value Npinlimb (pinion gear positive rotation-side limit value) of the rotation speed of the pinion gears P3 that rotate due to a difference in speed (rotation speed difference) between the sun gear S3 (first motor generator MG1) and ring gear R3 of the power split mechanism 3. The limit value Npinlimb of the rotation speed of the pinion gears P3 at the low engine rotation and high vehicle speed side (pinion gear positive rotation side) will be described later.

In the present embodiment, there is a characteristic in that, within the engine operation range shown in FIG. 3, for the engine operation range determined by the limit value of the pinion gear rotation speed, the limit value of the pinion gear rotation speed is set so as to be higher at the high engine rotation and low vehicle speed side than at the low engine rotation and high vehicle speed side.

Figure 4A:
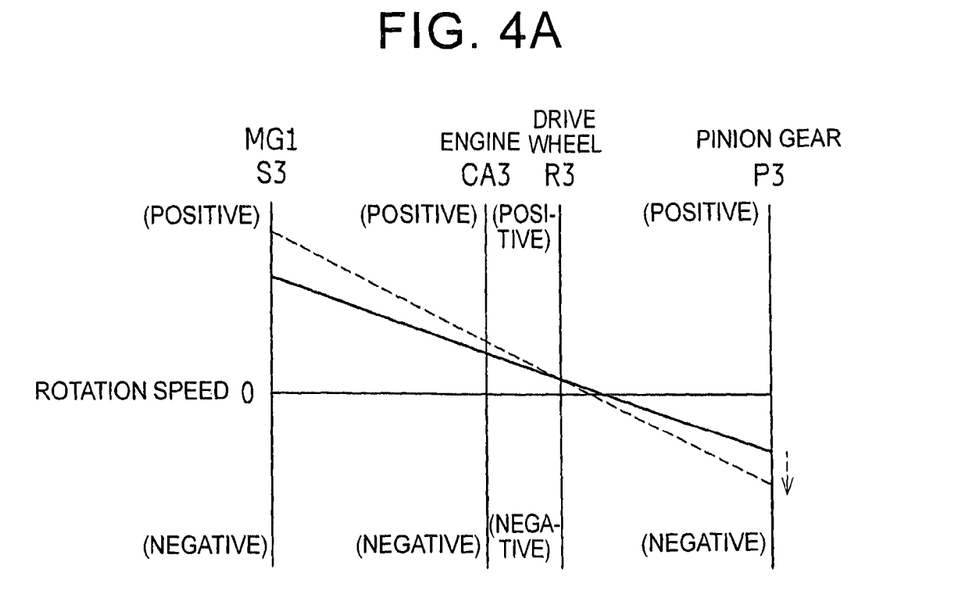
FIG. 4A is a nomograph that shows the rotation speeds of rotating elements of a power split mechanism in a high engine rotation and low vehicle speed range.
Figure 4B:
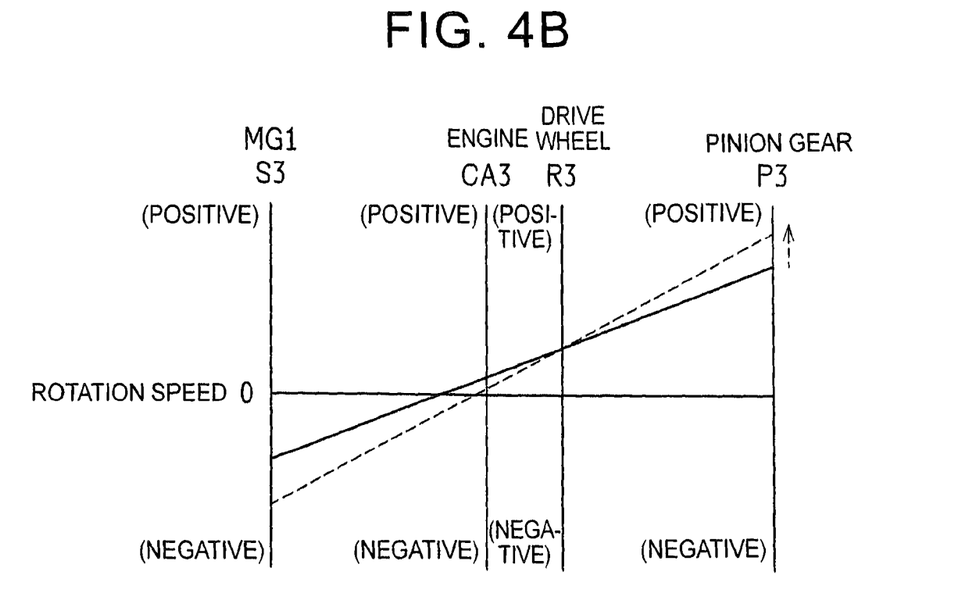
FIG. 4B is a nomograph that shows the rotation speeds of the rotating elements of the power split mechanism in a low engine rotation and high vehicle speed range.

This point will be described below with reference to FIG. 4A and FIG. 4B. In FIG. 4A and FIG. 4B, the four ordinate axes respectively represent the rotation speed of the first motor generator MG1 (sun gear S3), the rotation speed of the engine 1 (planetary carrier CA3), the rotation speed of the drive wheels 6 (ring gear R3) and the rotation speed of the pinion gears P3.

In the low engine rotation and high vehicle speed range, as shown in the nomograph of FIG. 4B, the first motor generator MG1 is at a negative rotation side, and the pinion gears P3 are at a positive rotation side. As an example of such a transitional variation in the low engine rotation and high vehicle speed range (pinion gear positive rotation-side range), as described above, the case where the engine rotation speed Ne is decreased by releasing the accelerator pedal while the vehicle is traveling at a high speed is assumed. In such a case, the engine rotation speed Ne is decreased by the torque of the first motor generator MG1, and the rotation speed of the pinion gears P3 increases toward the positive side (see the dashed line in FIG. 4B).

On the other hand, in the high engine rotation and low vehicle speed range, as shown in the nomograph of FIG. 4A, the first motor generator MG1 is at a positive rotation side, and the pinion gears P3 are at a negative rotation side. As an example of such a transitional variation in the high engine rotation and low vehicle speed range, the case where the engine rotation speed Ne is increased at a low vehicle speed by depressing the accelerator pedal while the vehicle is going up a hill is assumed. In such a case, the rotation speed of the pinion gears P3 increases toward a negative side (see the dashed line in FIG. 4A), and the engine torque increases due to an increase in the engine rotation speed Ne. Furthermore, the torque output of the second motor generator MG2 also increases in order to gain the output torque of the hybrid vehicle HV. Here, in order to increase the amount of current supplied to the second motor generator MG2, the first motor generator MG1 carries out regenerative operation. Therefore, the first motor generator MG1 works as a load on the engine 1, so the engine rotation speed Ne becomes hard to vary as compared to that in the low engine rotation and high vehicle speed range. That is, the engine rotation speed Ne more easily varies in the low engine rotation and high vehicle speed range, so the rate of transitional variation in the rotation speed of the pinion gears P3 increases (an overspeed of the pinion gears P3 more easily occurs).

Although there is a difference in transitional variation in the rotation speed of the pinion gears P3 between in the high engine rotation and low vehicle speed range and in the low engine rotation and high vehicle speed range, if the way of setting the limit value of the rotation speed of the pinion gears P3 is the same between in the high engine rotation and low vehicle speed range and in the low engine rotation and high vehicle speed range, an overspeed easily occurs in one of the ranges when the limit value is set so as to be suitable for the other one of the ranges. Thus, the durability of the pinion gears P3 may be adversely influenced or a decrease in vehicle performance due to unnecessary limitations on the engine operation range may occur.

In consideration of the above point, in the present embodiment, within the engine operation range shown in FIG. 3, for the engine operation range that is determined by the limit value of the pinion gear rotation speed, the limit value Npinlima (absolute value) of the pinion gear rotation speed at the high engine rotation and low vehicle speed side (pinion gear negative rotation side) is set so as to be higher than the limit value Npinlimb (absolute value) of the pinion gear rotation speed at the low engine rotation and high vehicle speed side (pinion gear positive rotation side). With the above configuration, when the vehicle travels at a low speed, the engine operation range may be used to a higher rotation (higher power) side for the same vehicle speed, so it is possible to minimize a decrease in acceleration performance (power performance). For the low engine rotation and high vehicle speed side, it is possible to set the limit value (limit value of the pinion gear rotation speed) at which it is possible to avoid an overspeed of the pinion gears P3.

In this way, according to the present embodiment, while unnecessary limitations on the engine operation range at the high engine rotation and low vehicle speed side (pinion gear negative rotation side) are avoided, it is possible to avoid an overspeed (overshoot) of the pinion gears at the low engine rotation and high vehicle speed side (pinion gear positive rotation side). Thus, it is possible to both ensure vehicle performance and ensure the durability of the pinion gears.

For the limit value Npinlima of the pinion gear rotation speed the high engine rotation and low vehicle speed side (pinion gear negative rotation side), for example, the permissible rotation speed may be obtained through an experiment or simulation using the vehicle speed V (drive wheel rotation speed) and the engine rotation speed Ne as parameters in consideration of a gear ratio ($Z_{R3}/Z_{P3}$) between the ring gear R3 and the pinion gears P3, the durability of the pinion gears P3, and the like, and the upper limit value of the permissible rotation speed may be set as the limit value Npinlima of the pinion gear rotation speed.

For the limit value Npinlimb of the pinion gear rotation speed at the low engine rotation and high vehicle speed side (pinion gear positive rotation side), for example, in consideration of the above-described difference in transitional variation in the pinion gear rotation speed (the point that the rate of transitional variation in the rotation speed of the pinion gears P3 increases in the low engine rotation and high vehicle speed range as compared to that in the high engine rotation and low vehicle speed range), a rotation speed (upper limit value) that is a value lower than the limit value Npinlima at the above-described high engine rotation and low vehicle speed side (|Npinlimb|<|Npinlima|) and at which it is possible to avoid an overspeed (overshoot) of the pinion gears P3 may be adapted through an experiment or simulation.

In the present embodiment, the ECU 100 controls the operation of the engine 1 on the basis of the engine operation range having the above-described characteristics.

Figure 5:
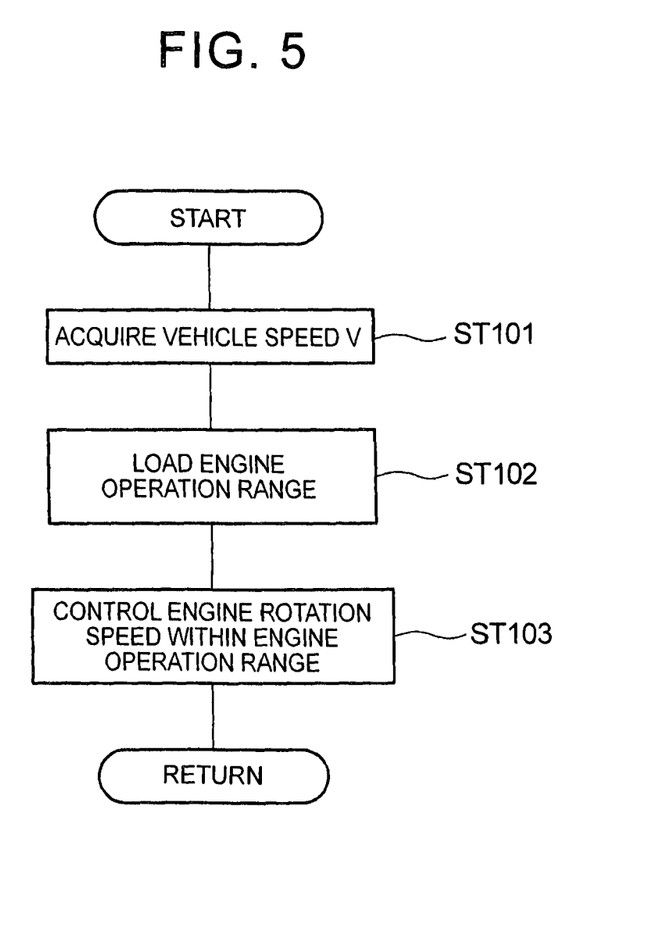
FIG. 5 is a flowchart that shows an example of engine operation control.

Specifically, as shown in FIG. 5, the ECU 100 acquires the vehicle speed V from the output signal of the vehicle speed sensor 107 (step ST101), and loads the engine operation range (map) shown in FIG. 3 (step ST102). Subsequently, the ECU 100 controls the hybrid system such that the engine 1 operates within the engine operation range (range surrounded by the solid line L shown in FIG. 3 (engine rotation speed limit range)) based on the current vehicle speed V (step ST103). Specifically, for example, the rotation speed Ne of the engine 1 is controlled with the use of the first motor generator MG1 such that the engine rotation speed Ne calculated from the output signal of the crank position sensor 101 does not exceed the engine operation range L (for example, does not exceed the engine rotation speed Ne (upper limit value) limited by the limit value Nmg1lim or limit value Npinlima in the high engine rotation and low vehicle speed range, and does not exceed the engine rotation speed Ne (lower limit value) limited by the limit value Npinlimb in the low engine rotation and high vehicle speed range).

A control routine shown in FIG. 5 is repeatedly executed at predetermined intervals (for example, several milliseconds) in the ECU 100. The vehicle speed V used in control shown in FIG. 5 may be, for example, calculated from an output signal of a wheel speed sensor that detects the rotation speed of one of the wheels, such as the drive wheels 6 and the driven wheels.

In the above-described embodiment, the description is made on the case in which the invention is applied to the FF vehicle (hybrid vehicle); however, the invention is not limited to this configuration. The invention is also applicable to a front-engine rear-drive (FR) vehicle or a four-wheel-drive vehicle.

The invention is effectively usable in control over a vehicle on which an engine (internal combustion engine) and an electric motor are mounted as driving power sources and which includes a power split mechanism in a powertrain.

The invention claimed is:

1. A vehicle comprising:
   an engine;
   a first electric motor configured to be able to input or output power;
   a power split mechanism including a sun gear, a ring gear and a planetary carrier that supports pinion gears, meshing with both the sun gear and the ring gear, such that the pinion gears are rotatable and revolvable, the planetary carrier being coupled to an output shaft of the engine, the sun gear being coupled to a rotary shaft of the first electric motor, the ring gear being coupled to a drive wheel;
   a second electric motor configured to be able to input or output power to or from the drive wheel; and
   an electronic control unit configured to set an engine operation range that is determined by a limit value of a rotation speed of the pinion gears of the power split mechanism such that the limit value of the rotation speed of the pinion gears is higher at a first absolute value than at a second absolute value, the first absolute value being the limit value of the rotation speed of the pinion gears of a high engine rotation and low vehicle speed side, the second absolute value being the limit value of the rotation speed of the pinion gears of a low engine rotation and high vehicle speed side, and control operation of the engine based on the engine operation range.

2. A control method for a vehicle including an engine; a first electric motor configured to be able to input or output power; a power split mechanism including a sun gear, a ring gear and a planetary carrier that supports pinion gears, meshing with both the sun gear and the ring gear, such that the pinion gears are rotatable and revolvable, the planetary carrier being coupled to an output shaft of the engine, the sun gear being coupled to a rotary shaft of the first electric motor, the ring gear being coupled to a drive wheel; and a second electric motor configured to be able to input or output power to or from the drive wheel, the control method comprising:
- setting, by an electronic control unit, an engine operation range that is determined by a limit value of a rotation speed of the pinion gears of the power split mechanism such that the limit value of the rotation speed of the pinion gears is higher at a first absolute value than at a second absolute value, the first absolute value being the limit value of the rotation speed of the pinion gears of a high engine rotation and low vehicle speed side, the second absolute value being the limit value of the rotation speed of the pinion gears of a low engine rotation and high vehicle speed side; and
- controlling, by an electronic control unit, operation of the engine based on the engine operation range.

* * * * *